(12) United States Patent
Yamamoto et al.

(10) Patent No.: US 6,573,444 B1
(45) Date of Patent: Jun. 3, 2003

(54) MUSIC DATA COMPRESSION APPARATUS AND METHOD

(75) Inventors: Takayoshi Yamamoto, Tokyo (JP); Reisuke Sato, Tokyo (JP); Yasufumi Hayashi, Tokyo (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/625,347

(22) Filed: Jul. 25, 2000

(30) Foreign Application Priority Data

Jul. 29, 1999 (JP) .......................................... 11-215971

(51) Int. Cl.$^7$ ................................................. G10H 7/00
(52) U.S. Cl. ............................. 84/604; 84/603; 84/615
(58) Field of Search .................... 84/602–645

(56) References Cited

U.S. PATENT DOCUMENTS

| 4,622,877 A | * | 11/1986 | Strong | 84/604 |
| 5,329,062 A | * | 7/1994 | Kaneko | 84/603 |
| 5,442,126 A | * | 8/1995 | Tokiharu | 84/603 |
| 5,459,279 A | * | 10/1995 | Okamoto | 84/604 |
| 5,634,031 A | | 5/1997 | Sakuma | |
| 5,728,962 A | * | 3/1998 | Goede | 84/609 |
| 5,756,915 A | * | 5/1998 | Matsuda | 84/602 |
| 5,777,249 A | * | 7/1998 | Suzuki | 84/604 |
| 5,808,225 A | * | 9/1998 | Corwin et al. | 84/622 |
| 5,949,011 A | * | 9/1999 | Ichiki | 84/602 |
| 5,986,198 A | * | 11/1999 | Gibson et al. | 84/603 |

FOREIGN PATENT DOCUMENTS

| DE | 42 21 321 A1 | 2/1993 |
| EP | 0 577 366 A3 | 1/1994 |
| EP | 0 613 135 A3 | 8/1994 |
| EP | 0 896 334 A2 | 2/1999 |
| GB | 2 257 606 A | 1/1993 |

* cited by examiner

Primary Examiner—Marlon T. Fletcher
(74) Attorney, Agent, or Firm—Sughrue Mion, PLLC (57) ABSTRACT

In a music apparatus 50 of this invention, digital data received at a digital input terminal 20 are stored in a primary memory area 22a on a hard disk drive 22. Subsequently, a music data converter 23 performs a predetermined conversion of the digital data stored in the primary memory area 22a to obtain digital data having a different form, and the altered data are thereafter stored in a secondary memory area 22a on the hard disk drive 22.

4 Claims, 5 Drawing Sheets

| DIAL BUTTON | 1 | 2 | 3 | 4 | 5 | 6 | 7 | 8 | 9 | 0 |
|---|---|---|---|---|---|---|---|---|---|---|
| 1 | ア | イ | ウ | エ | オ | ァ | ィ | ゥ | ェ | ォ |
| 2 | カ | キ | ク | ケ | コ | ッ | | | | |
| 3 | サ | シ | ス | セ | ソ | | | | | |
| 4 | タ | チ | ツ | テ | ト | | | | | |
| 5 | ナ | ニ | ヌ | ネ | ノ | | | | | |
| 6 | ハ | ヒ | フ | ヘ | ホ | | | | | |
| 7 | マ | ミ | ム | メ | モ | | | | | |
| 8 | ヤ | ユ | ヨ | | | | | | | |
| 9 | ラ | リ | ル | レ | ロ | | | | | |
| 0 | ワ | ヲ | ン | | | | | | | |

First digit: top row (1–0). Second digit: left column (1–0).

FIG. 3B

| DIAL BUTTON | 1 | 2 | 3 | 4 | 5 | 6 | 7 | 8 | 9 | 0 |
|---|---|---|---|---|---|---|---|---|---|---|
| 1 | A | B | C | D | E | a | b | c | d | e |
| 2 | F | G | H | I | J | f | g | h | i | j |
| 3 | K | L | M | N | O | k | l | m | n | o |
| 4 | P | Q | R | S | T | p | q | r | s | t |
| 5 | U | V | W | X | Y | u | v | w | x | y |
| 6 | Z | z | | | | | | | | |
| 7 | | | | | | | | | | |
| 8 | | | | | | | | | | |
| 9 | | | | | | | | | | |
| 0 | | | | | | | | | | |

First digit: top row (1–0). Second digit: left column (1–0).

FIG. 4A

MUSICIAN'S NAME: [ AMURO ]

| MUSIC NUMBER | MUSIC NAME | PLAY TIME |
|---|---|---|
| 1 | | |
| 2 | | |
| 3 | | |
| 4 | | |
| ⋮ | | |
| 12 | | |

SELECTED MUSIC:                                    DUBBING MODE

FIG. 4B

GENRE NAME: [ POPS ]

| MUSIC NUMBER | MUSIC NAME | MUSICIAN'S NAME | PLAY TIME |
|---|---|---|---|
| 1 | | | |
| 2 | | | |
| 3 | | | |
| 4 | | | |
| ⋮ | | | |
| 12 | | | |

SELECTED MUSIC:                                    DUBBING MODE

MUSIC DATA COMPRESSION APPARATUS AND METHOD

BACKGROUND OF THE INVENTION

1. Field of the Invention

The present invention relates to a musical apparatus for storing and managing large quantities of digitized music data, which were previously recorded on a variety of recording media, while maintaining the data as digital signals, i.e., as digital data, and that for output, converts stored digital data into digital data having a different form, so that music data can be digitally copied to recording media other than those on which they were originally recorded.

2. Description of the Related Art

Recently, prices of personal computers (hereinafter referred to as a PC) have dropped precipitously and there has been a drastic increase in the signal processing speeds and memory capacities that are available. These factors have been accompanied by a rapid expansion in the PC market and in the spread of computers to private homes. Concurrently, the services available to home users, such as those accessible via the Internet, have been improved and telephone toll charges have been reduced.

Home PCs can not only be used for clerical work, such as word processing and spread sheet calculations, but can also be used to obtain enormous quantities of information, such as game software data, via the Internet, and to store these data on built-in hard disks. However, the two background factors that have contributed the most to the present wide employment of PCs is the reduction in the prices of the computers and the increase in the memory capacities of the hard disks that are available for use with them.

In an average home, each family member owns a number of music CDs, or MDs, and invests a great deal of effort in the management of these disks. Further, in an average home rental music CDs are dubbed to other recording media, such as MDs.

SUMMARY OF THE INVENTION

It is, therefore, an object of the invention to provide a home-use musical apparatus that employs large-capacity storage means, such as a hard disk drive.

To achieve the above object, according to a first aspect of the invention, a musical apparatus comprises:

a music data input unit for receiving music data that have been converted into digital signals; and storage means for storing the music data, wherein the music data stored in the storage means are inhibited from being output in the same form in which input.

According to a second aspect of the invention, for the music apparatus according to the first aspect, the storage means is a predetermined storage area in large-capacity storage means that is provided for the music apparatus.

According to a third aspect of the invention, the music apparatus according to the first or second aspect further comprises: a music data converter for performing a predetermined conversion of the music data stored in the storage means in order to obtain digital music data signals having a different form.

According to a fourth aspect of the invention, for the music apparatus according to the third aspect, the digital music data signals, obtained by the music data converter, that have the different form are stored in a storage area that differs from the predetermined storage area in the large-capacity storage means.

According to a fifth aspect of the invention, a music apparatus comprises:

a music data input unit for receiving music data that constitute digital signals;

storage means for storing the music data; and a music data converter for converting the music data stored in the storage means into digital music data signals having a form that differs from that of the input data form.

According to a sixth aspect of the invention, for the music apparatus according to the fifth aspect, the music data converter alters the music data to obtain digital music data signals having a form, or having one of several forms, that differs from the input form.

According to a seventh aspect of the invention, for the music apparatus according to the fifth or the sixth aspect, the music data converter performs the conversion of the music data in parallel to the input of the music data to the music apparatus.

According to an eight aspect of the invention, for the music apparatus according to the fifth or the sixth aspect, the music data converter performs the conversion of the music data during a period in which manipulation of the music data by a user does not occur.

In the music apparatus of the invention, the digital music data signals are received by the music data input unit and are stored in the storage means, and the output of the music data in the input form is inhibited. Thus, the digital signals of music data that are input can be prevented from being output unchanged. Since the music data converter is provided for the music apparatus, it can perform a predetermined conversion of the music data stored in a predetermined area of the storage means, and can obtain digital music data signals having a different form. Therefore, digital copying can be easily performed.

DETAILED DESCRIPTION OF THE PRESENT INVENTION

The arrangement of a music apparatus 50 according to the preferred embodiment of the present invention will now be described while referring to FIG. 1.

When a CD reproduction device 15 reproduces music information in a digital signal form, i.e., digital music data, read from a music CD 1 on which the music information is recorded as digital signals, the music apparatus 50 of the invention stores the obtained music data on an incorporated hard disk drive 22, which will be described later, and then outputs the stored data as digital data having a form that differs from the form used for the data when it was stored on the hard disk drive 22.

Figure 1:
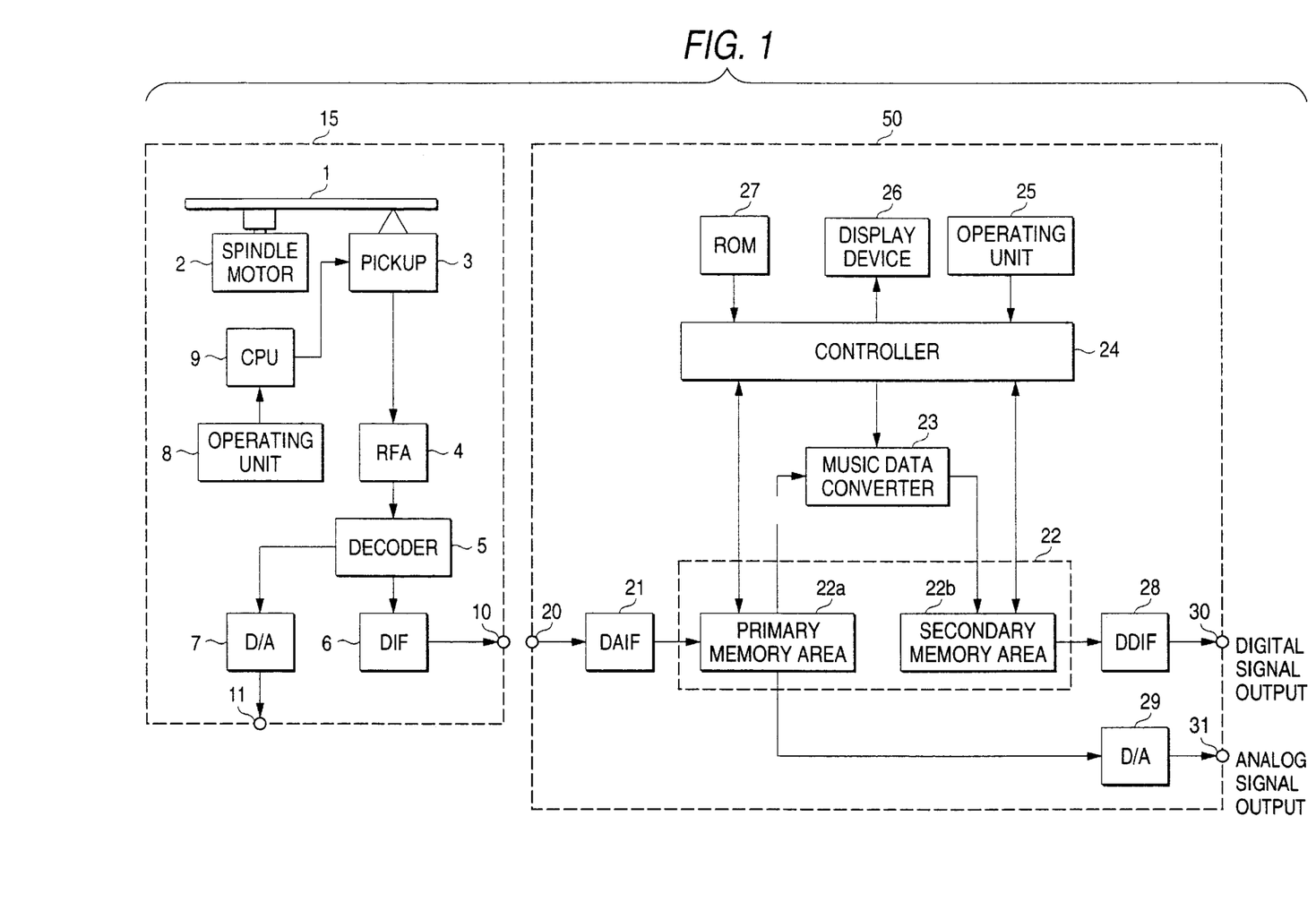
FIG. 1 is a circuit diagram showing a music apparatus according to one embodiment of the invention.

FIG. 1 is a diagram showing the circuit structures of the music apparatus 50 of the invention and of the CD reproduction device 15. The processing for reproducing the music recorded on a CD 1 will be explained in order to provide a description of the operation used to record digital music data on the hard disk drive 22.

First, the circuit structure of the CD reproduction device 15 will be described.

The CD reproduction device 15 comprises: a spindle motor 2, for rotating the music CD 1, the recording medium on which digital music data signals are recorded; an optical pickup 3, for reading data recorded as a bit string on the music CD 1 and for outputting the data as an RF signal; an RF amplifier 4, for amplifying the RF signal; a decoder 5, for performing EFM demodulation and CIRC decoding; a digital interface (DIF) 6, for outputting, unchanged, digital signals produced by the decoder 5, i.e., for outputting digital data; a D/A converter 7, for converting the digital data output by the decoder 5 into analog data; a CPU 9, for controlling the CD reproduction device 15; and an operating unit 8.

Based on the output of the RF amplifier, a spindle error signal, a focus error signal and a tracking error signal are generated, and servo means (not shown) controls the rotational speed of the music CD 1 and drives the optical pickup 3. The digital data output by the decoder 5 are transmitted via the DIF 6 through a digital output terminal 10, while the digital data are converted into analog data by the D/A converter 7 and the analog data are output through an analog output terminal 11.

The circuit structure of the music apparatus 50 of the invention will now be explained.

The music apparatus 50 comprises: a digital input terminal 20 and a digital audio interface (DAIF) 21, which are music data input units for receiving digital music data signals; a hard disk drive 22, which is a large-capacity storage means; a music data converter 23, for compressing and converting digital data into digital data having a different form; a controller 24, for providing overall control for the music apparatus 50; an operating unit 25, for issuing an operating instructions; a display device 26, for displaying the contents of an instruction or the contents of an operation that is currently being executed by the controller 24; a ROM 27, in which an operating program for the music apparatus 50 is stored in advance; a digital data interface (DDIF) 28, for outputting the digital data obtained by the music data converter 23; and a D/A converter 29, for converting the digital data into analog data.

The internal storage area of the hard disk drive 22 is separated into a primary memory area 22a and a secondary memory area 22b. The digital data received from the digital input terminal 20 are temporarily stored in the primary memory area 22a, and under the control of the controller 24, which will be described later, are read from the primary memory area 22a and are transmitted to the music data converter 23.

The music data converter 23 has available a plurality of compression functions, such as the MP3 (MPEG Audio Layer-3) compression technique and the ATRAC compression technique, which is used by an MD player. The music data converter 23 employs one of these compression functions to convert the digital data from compressed digital data into a different form (hereinafter referred to as compressed data), and stores the compressed data and information concerning the type of compression method used in the secondary memory area 22b.

The MP3 technique, in accordance with the international "MPEG-1" standard used for specifying compression techniques, such as for sound and moving images, is an audio compression technique that can produce compressed music data that, while approximately ¹⁄₁₀ the size of the original data, can provide the same reproduction quality as does data recorded on a CD.

The digital data stored in the primary memory area 22a of the hard disk drive 22 are converted into analog data by the D/A converter 29, and the analog data are output through an analog output terminal 31. Thus, the digital data stored in the primary memory area 22a, which are managed by the controller 24, can be output only to the music data converter 23 or to the D/A converter 29, and can not be output by the music apparatus 50 unchanged, in the form in which they were input.

The compressed data stored in the secondary memory area 22b of the hard disk drive 22 can be output, via the digital data interface 28, through a digital output terminal 30. That is, the music apparatus 50 of this invention is designed so that the output in its original form of the digital music data stored on the hard disk drive 22 is inhibited, and so that digital music data output by the music apparatus 50 has a different form, obtained by compressing the digital data that is input.

Figure 2:
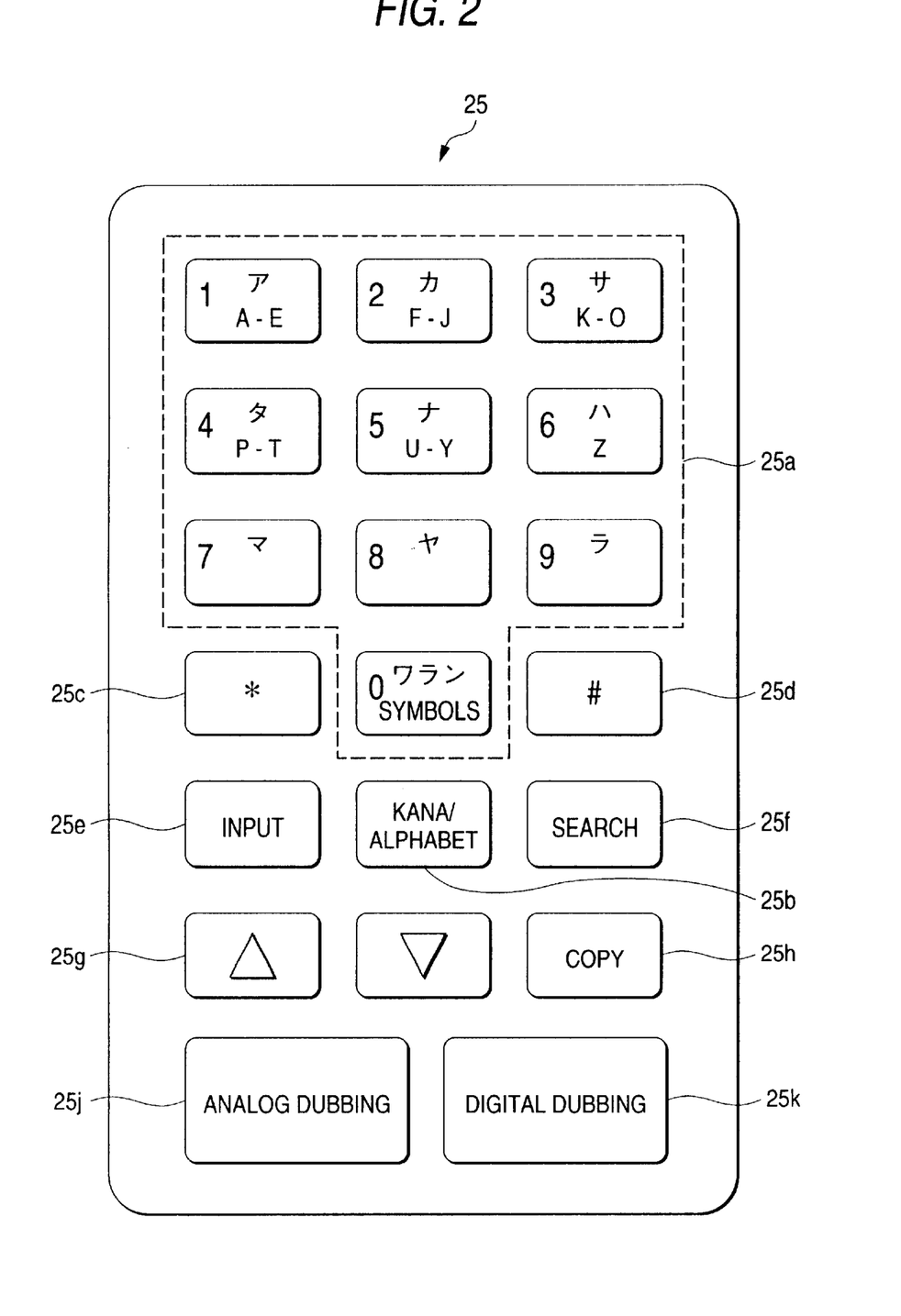
FIG. 2 is a diagram showing the operating unit for the music apparatus of this invention.

The operating unit 25 of the music apparatus 50 includes number keys 25a, into which letters of the alphabet and kana characters that are one of Japanese characters are carved, and various other manipulation keys, as is shown in FIG. 2. When the digital music data are to be stored on the hard disk drive 22, these keys are used to input not only TOC information for the music CD 1, but also the names of musical pieces, the names of musicians and the musical genres, and to search for the names of musical pieces, the names of musicians, and the music genres that were stored in advance on the hard disk drive 22. For example, not only the numeral "1" but also a kana letter "ア" and the letters of the alphabet, "A–E," are carved into the "1" key of the number keys 25a. By manipulating the "kana/alphabet" key 25b, the number keys 25a can be used to enter or display the names of musical pieces, the names of musicians and the music genres, or the number keys 25a can be used to enter data for a search.

In addition to the number keys 25a and the "kana/alphabet" key 25b, the operating unit 25 includes: a "*" key 25c, for sorting music numbers or for separating the name of a musician and a genre; a "#" key 25d, for indicating the end of the operation; an "input" key 25e, for selecting an input mode for the entry of the name of a musical piece, the name of a musician and the music genre; a "search" key 25f, for searching for the names of musical pieced, musician names and music genres that were stored in advance on the hard disk drive 22; a "△▽" key 25g, for scrolling music names; a "COPY" key 25h, for storing musical pieces on the music CD 1 on the hard disk drive 22; an "analog dubbing" key 25j, for dubbing music data in an analog form; and a "digital dubbing" key 25k for dubbing compressed data. If the operating unit 25 is a remote controller, signals output by the operating unit 25 may be transmitted to the music apparatus 50 from a distance using infrared rays (not shown) If the operating unit 25 is integrally formed with the music apparatus 50, signals are transmitted directly from the operating unit 25 to the music apparatus 50.

An explanation will now be given for an operating method when the operating unit 25 is employed by a user to enter the name of a musical selection, a musician's name and the music genre.

Figure 3A:
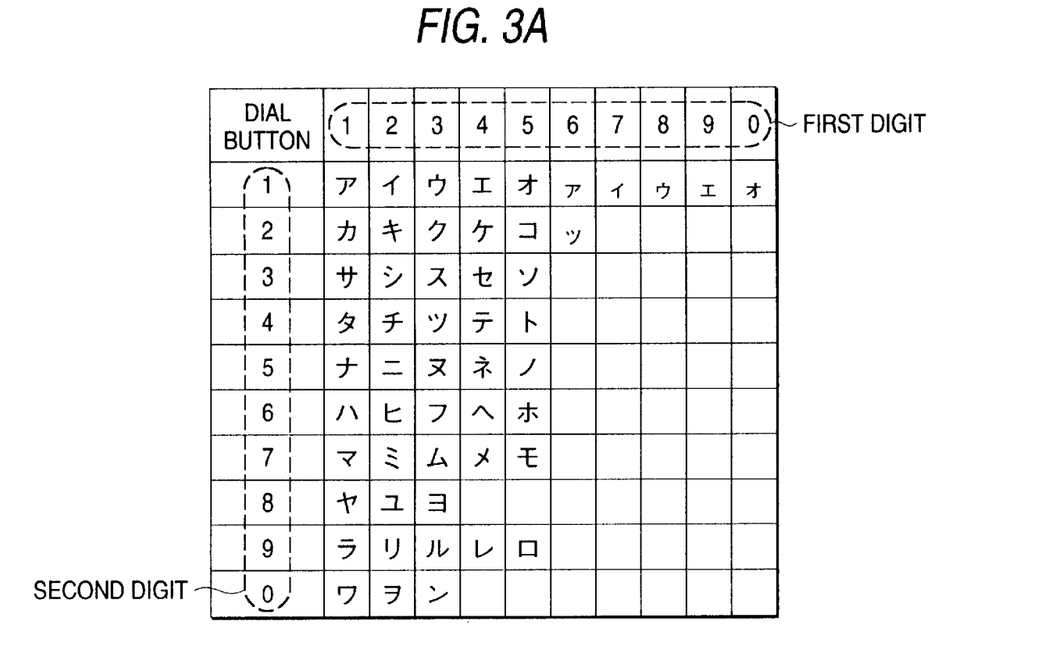
FIGS. 3A and 3B are diagrams showing, in a matrix, the relationship between the kana characters and letters of the alphabet that are entered by the manipulation of the number keys constituting the operating unit of the music apparatus of the invention.
Figure 3B:
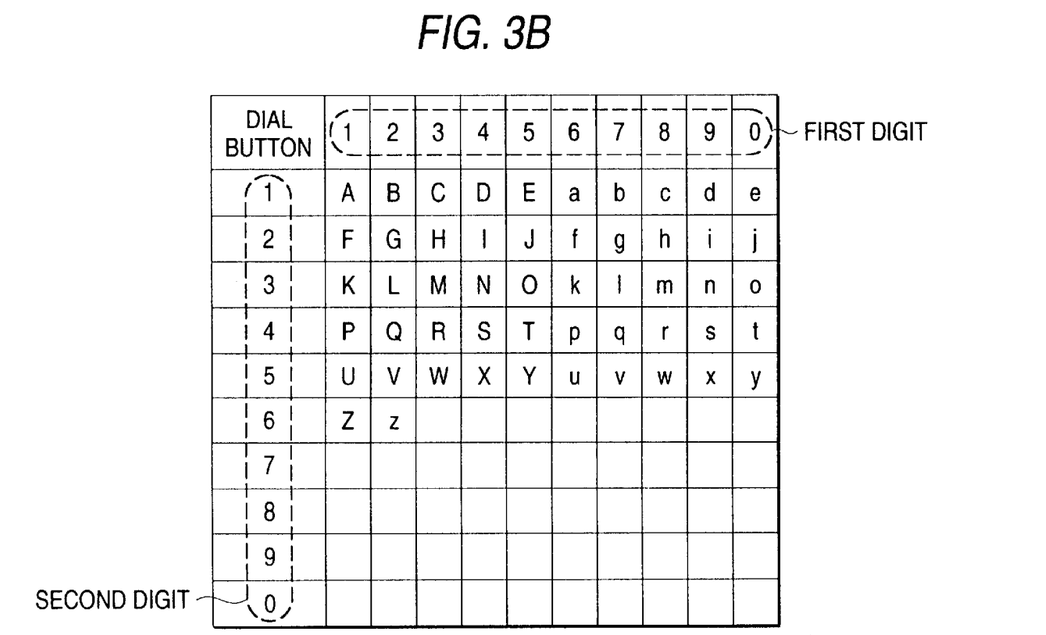

FIGS. 3A and 3B are matrix tables showing the relationship between the kana characters and letters of the alphabet that are entered using the number keys 25a. In FIG. 3A, the relationship between the kana characters and the number key 25a is shown, and in FIG. 3B, the relationship between the letters of the alphabet and the number key 25a is shown. One kana character or one letter is selected by entering two digits.

For example, when kana characters are being used, to select "ア . . . " for display on the display device 26, since the kana character "ア", as is shown in FIG. 3A, is located in the first column of the first row in the table, the "1" of the number keys 25a must be depressed two times to bring the character "ア" up.

Therefore, when a musician's name, "ア . . . ," is to be entered using kana characters, in addition to the TOC information from the music CD 1, the "*" key 25c, used to indicate the musician's name, the "input" key 25g, for indicating the input mode, and the "kana/alphabet" key 25b, for changing the kana characters, are manipulated, and the "1" of the number keys 25a and the "#" key 25d for indicating the end of the operation are depressed in the named order. As a result, the "ア. . . " is displayed on the display device 26. Since the entry of letters of the alphabet can be performed in the same manner, the name of the music selection, the musician's name and the music genre can be stored on the hard disk drive 22, together with the digital music data, using either kana characters or letter of the alphabet.

It should be noted that designating the musician's name is accomplished by depressing the "*" key 25c once and designating the music genre is accomplished by depressing the "*" key 25c twice, and that the delimiting of a musical selection number is performed by inserting an "*" between numerals.

An explanation will now be given for an operating method used when a user employs the operating unit 25 to search for the name of a musical selection, a musician's name and a musical genre stored on the hard disk drive 22.

Figure 4A:
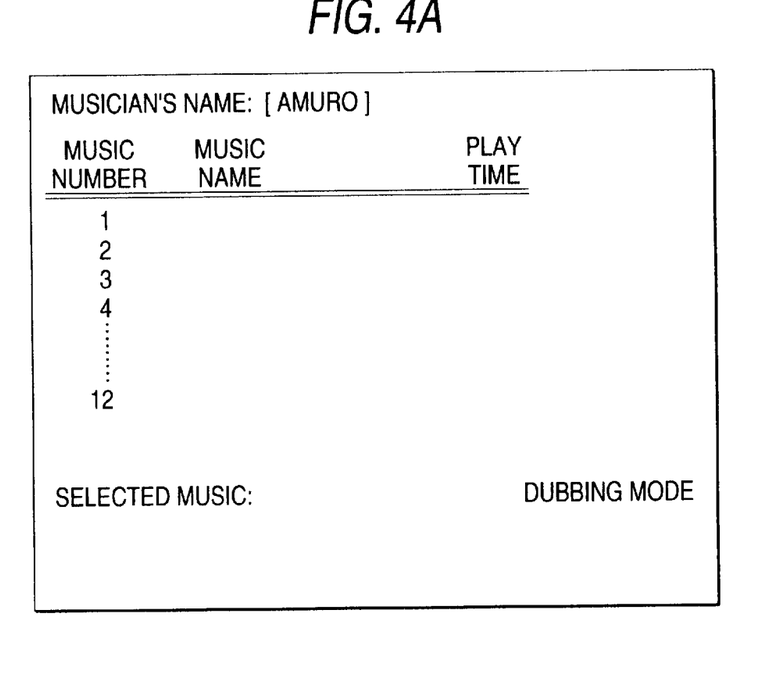
FIGS. 4A and 4B are diagrams showing a method used to display data on the display device of the music apparatus of the invention.
Figure 4B:
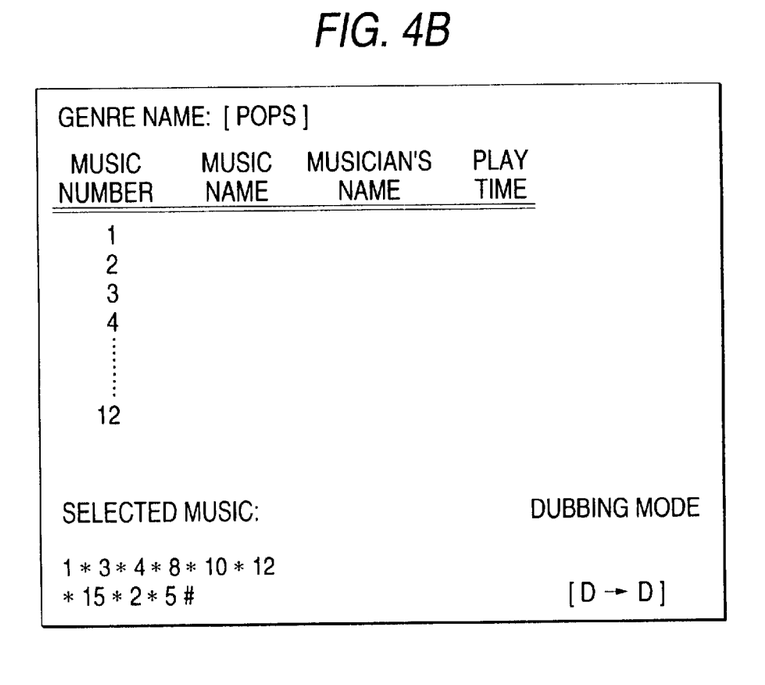

When the user manipulates the "*" key 25c, the "search" key 25f and the "#" key 25d and selects "ア . . . ," only those musical pieces designated as "ア . . . " are extracted from a large number of musical pieces that have been stored in advance on the hard disk drive 22, and the musicians' names "ア . . . ," the musical selection names and the playing times are displayed on the display device 26, as is shown in FIG. 4A. A music number is provided for each of the musical selection names in the order in which the musical pieces are stored on the hard disk 22. When there are many musical selection names, the user can scroll through them by using the "△▽" key 25g of the operating unit 25. Or if the user depresses the "*" key 25c of the operating unit 25 twice, manipulates the "search" key 25f and the "#" key 25d, and enters "POPS," only musical pieces designated as "POPS" are extracted from the large number of musical pieces that are stored on the hard disk drive 22. With "POPS" indicated as the genre, the names of the musical pieces, the names of the musicians, and the play times are displayed on the display device, as is shown in FIG. 4B.

When the user desires to perform dubbing for a plurality of desired musical pieces selected from among those displayed on the display device 26, the user enters the music numbers using the number keys 25a of the operating unit 25, and then depresses the "*" key 25c. The controller 24 assumes a music number is "12" when the "1" and "2" number keys 25a are depressed sequentially, or assumes music numbers are "1" and "2" when "1," "*" and "2" are depressed. When the user depresses the "digital dubbing" key 25k after the "*" key 25d, to perform the dubbing of music using a digital data form, the digital data for musical pieces are read from the secondary memory area 22b, in the order in which the music numbers were designated, and are output through the digital signal output terminal 30 via the digital data interface 28. When, however, the user manipulates the "analog dubbing" key 25j, the digital data for musical pieces are read from the primary memory area 22a, in the order in which the music numbers were designated, and are converted into analog data by the D/A converter 29. The analog data are then output through the analog output terminal 31.

An explanation will now be given for the processing performed by the CD reproduction device 15 to reproduce the music CD 1, and the processing performed by the music apparatus 50 to store digital data.

The music CD 1 loaded into the CD reproduction device 15 is rotated as the user manipulates the operating unit 8. The optical pickup 3 irradiates the rotating music CD 1 with a laser beam, detects the reflected light to read the data that are recorded as pits on the music CD 1, and transmits the data to the RF amplifier 4. The RF signal is amplified by the RF amplifier 4 and is then transmitted to the decoder 5. The decoder 5 performs the EMF demodulation and CIRC decoding for the RF signal, and outputs the results through the digital output terminal 10 via the digital interface 6. If the user sets, for example, the "ALL COPY" mode, the CD reproduction device 15 sequentially reproduces all the musical pieces recorded on the music CD 1, and outputs them as digital data.

To store in the music apparatus 50 musical pieces recorded on the music CD 1, the user manipulates the operating unit 25 of the music apparatus in the above described manner to enter the name of a musical selection, the name of a musician and the musical genre, using kana characters or letters of the alphabet, in the order in which the musical pieces are recorded on the music CD 1. When the controller 24 of the music apparatus 50 detects the manipulation by the user of the "COPY" key 25h of the operating unit 25, the controller 24 issues an instruction for the digital data read from the music CD 1, which are received at the digital input terminal 20 and retransmitted via the digital audio interface 21, to be stored in the primary memory area 22a of the hard disk drive 22, and for the digital information for the name of the musical selection, the name of the musician and the musical genre entered by the user to be stored in the primary memory area 22a in consonance with the order in which the data for the musical piece are received.

The user employs the CD reproduction device 15 to reproduce multiple music CDs 1 owned by family members, as well as rental CDs 1, and performs the above described manipulation sequences to store, on the hard disk drive 22 of the music apparatus 50, not only the digital data read from the music CDs 1, but also digital data for the names of musical pieces, the names of musicians and the musical genres. By the repeated performance of these operations, the music apparatus 50 can be set up to serve as a music bank that facilitates, from among a large number of musical pieces stored on the hard disk drive 22, the immediate selection of a desired musical rendition. Musical reproduction choices can also be effected by employing the names of musicians and musical genres. And regardless of how selected, musical pieces can be reproduced in a specified, desired order.

Figure 5:
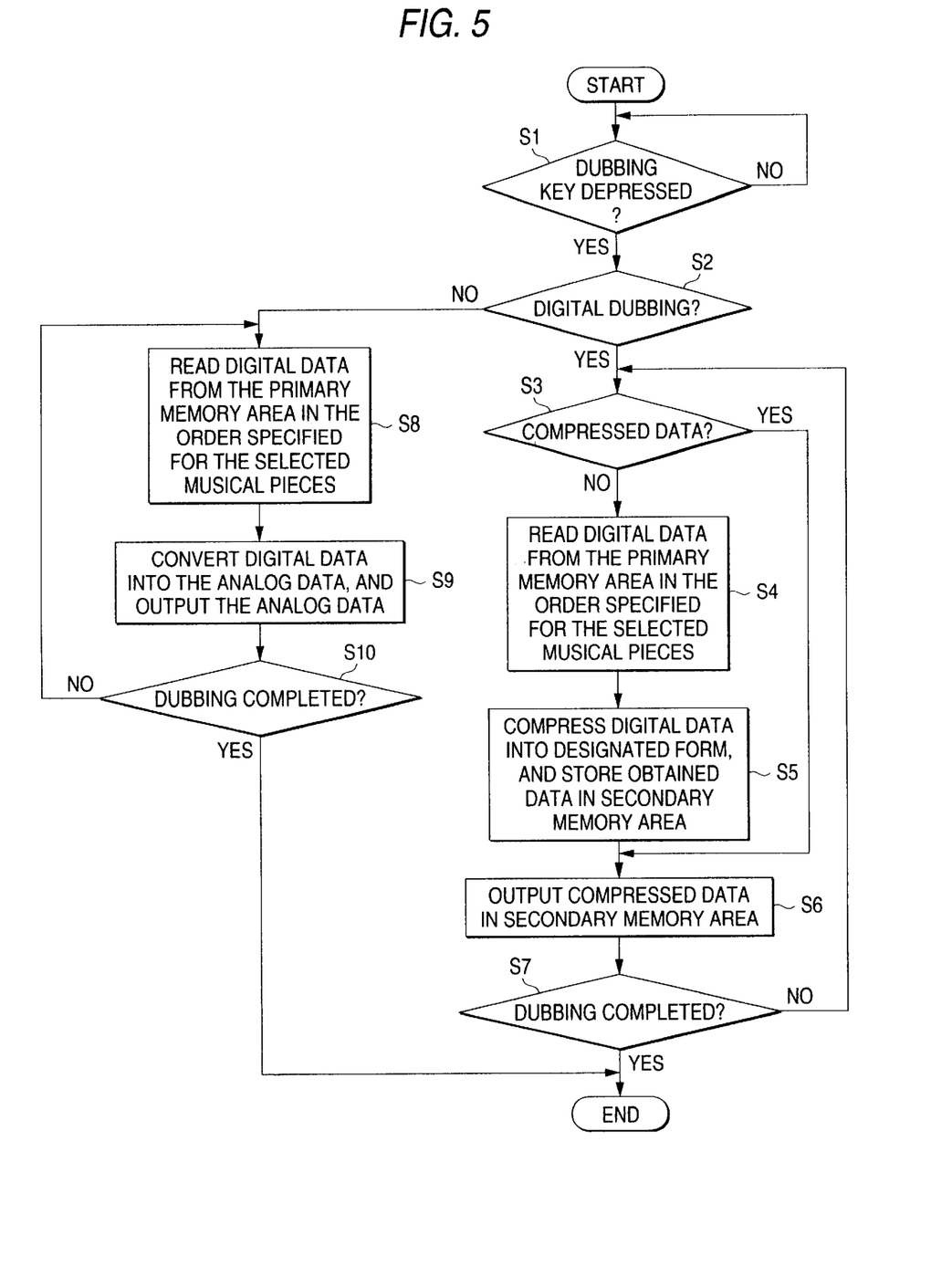
FIG. 5 is a flowchart showing the processing performed when the music apparatus of the invention is dubbing data for the musical pieces that are stored on the hard disk drive.

The processing used to dub digital data for musical pieces that are stored on the hard disk drive 22 of the music apparatus 50 will now be described while referring to the flowchart in FIG. 5.

For this processing, a user selects a plurality of desired musical pieces, from among those listed on the display device 26, before he or she depresses the "digital dubbing" key 25*k* or the "analog dubbing" key 25*j*. The processing performed while referring to the flowchart is for an operating program, stored in advance in the ROM 27, that is executed in response to the manipulation by a user of the operating unit 25.

At step S, the controller 24 of the music apparatus 50 continuously monitors the operating unit 25 to determine whether a user has manipulated the "digital dubbing" key 25*k* or the "analog dubbing" key 25*j*. When, at step S1, it is determined that a user has manipulated the "digital dubbing" key 25*k* or the "analog dubbing" key 25*j* (YES), program control advances to step S2. At step S2, the controller 24 determines whether the user has depressed the "digital dubbing" key 25*k*. When instead the user has depressed the "digital dubbing" key 25*j* (NO), program control shifts to step S8.

At step S8, the controller 24 reads, from the primary memory area 22*a*, the digital data for selected musical pieces in the order designated by the user, and program control advances to step S9. At step S9, the controller 24 transmits, to the D/A converter 29, the digital data for the selected musical pieces that are read from the primary memory area 22*a*. The D/A converter 29 converts the digital data into analog data, and outputs the analog data through the analog output terminal 31. The obtained analog signal is dubbed to an analog recording/reproduction device (not shown). When the controller 24 detects that the analog signal has been dubbed to the analog recording/reproduction device, program control advances to step S10. At step S10, the controller 24 performs monitoring to determine whether the dubbing of all the musical pieces selected by the user has been is completed. When the dubbing has not been completed (NO), program control returns to step S8, and the process at step S8 and the following steps is repeated. When, at step S10, the controller 24 ascertains that the dubbing of all the musical pieces has been completed (YES), the dubbing operation is terminated.

When, at step S2, the controller 24 ascertains that the user has depressed the "digital dubbing" key 25*k* (YES), program control advances to step S3. At step S3, the controller 24 determines whether the data for the musical pieces that have been selected by the user have already been converted, by the music data converter 23, into a compressed data form specified by the user, and whether the compressed data have been stored in the secondary memory 22*b*. If the data for the selected musical pieces are not compressed data stored in the secondary memory 22*b* (NO), program control advances to step S4. At step S4, the controller 24 reads from the primary memory area 22*a*, in the designated order, the digital data for the musical pieces that have been selected. Then, at step S5, based on a control signal received from the controller 24, the music data converter 23 compresses the digital data read from the primary memory area 22*a* into a desired form, as specified by the user, and stores, in the secondary memory area 22*b*, the compressed data and relevant information.

The user may specify a form to be used for the compressed data at the same time as he or she depresses the "digital dubbing" key 25*k*, or may instead specify a form to be used in advance.

At step S6, the controller 24 reads the compressed data for the selected musical pieces from the secondary memory area 22*b*, and outputs the data through the digital output terminal 30 via the digital interface 28. Program control thereafter advances to step S7.

The digital output terminal 30 is connected to a digital recording/reproduction device (not shown), in which the compressed data for the selected musical pieces are stored.

At step S7, the controller 24 determines whether the dubbing of all the musical pieces selected by the user has been completed. When the dubbing has not yet been completed (NO), program control returns to step S3 and the processing at step S3 and the following steps is repeated. However, when it is determined at step S7 that the dubbing of all the musical pieces has been completed (YES), the dubbing process is terminated. Returning now to step S3, if the controller 24 ascertains that all the musical pieces selected by the user have already been converted into compressed data (YES), program control is advanced to step S6, and the processing performed at step S6 and the following steps is performed.

In another example of the dubbing of digital data, the digital data for the musical pieces recorded on the music CD 1 are temporarily stored in the primary memory area 22*a* of the hard disk drive 22. Then, when a user depresses the "digital dubbing" key 25*k*, the digital data stored in the primary memory area 22*a* are compressed by the music data converter 23 using provide a desired form, as specified by the user, and the compressed data are stored in the secondary memory area 22*b*. Then, the compressed data are read from the secondary memory area 22*b* and are output.

As a further example, the digital data for the musical pieces recorded on the music CD 1 may be input to the music apparatus 50, and may concurrently be compressed using a desired form, as specified by a user, and may subsequently be output by the music apparatus 50. In this case, the controller 24 stores the digital music data to be transmitted by the music apparatus 50, i.e., the controller 24 temporarily stores the digital data for the musical pieces read from the music CD 1 in the primary memory area 22*a* of the hard disk 22. The music apparatus 50 may also output digital data having a different form, i.e., the music data converter 23 may compress the digital data stored in the primary memory area 22*a* to provide a desired form, as designated by the user, and store the compressed data in the secondary memory area 22*b*, and the music apparatus 50 may then output the compressed data. In other words, the storing of data in the primary memory area 22*a* for each musical piece, the data compression performed by the music data converter 23, and the storing of data in the secondary memory 22*b* may all be performed at the same time.

As one more example, when a user does not issue a dubbing instruction after he or she has input, to the music apparatus 50, the digital data for the musical pieces recorded on the music CD 1, the controller 24 monitors the status of the employment by the user for the music apparatus 50. When the user does not operate the music apparatus 50, the controller 24 may permit the music data converter 23 to compress, into a desired form, the digital data stored in the primary memory area 22*a*, and may automatically store the obtained compressed data in the secondary memory area 22*b*. Therefore, a busy period during which the controller 24 must provide a variety of commands for the music apparatus 50 can be avoided, and the compression/conversion process for the digital data can be completed within a short period of time. The compression/conversion operation performed at this time is the conversion of data into a compressed form that the user designated in advance for the music apparatus 50.

The digital recording/reproduction device is a very small recording/reproduction device that includes an MP3 decoder for which a flash EEPROM, for example, is employed as a recording medium.

As is described above, the MP3 compression technique can produce compressed music data that, while approximately 1/10 the size of the original data, can provide the same reproduction quality as do the musical selections recorded on a CD. Also, many musical pieces can be dubbed by using the flash EEPROM as a recording medium. Further, since the recording media are very compact, the size of the reproduction device can be reduced.

According to the music apparatus of the invention, the MP3 compression technique or the ATRAC compression technique is employed when the music data converter 23 converts digital data stored in the primary memory area 22a of the hard disk drive 22. Note, however, that there is no limit on the digital data conversion forms that can be used, and the application of compression techniques that are developed in the future is contemplated.

According to the invention, since a hard disk drive, a large-capacity storage medium, is used for a home music apparatus, an enormous amount of digital data, such as the contents of multiple music CDs and music MDs that may be accumulated by the occupants of a home, can be stored and managed, and a desired musical piece can be immediately requested and output in a compressed data form, thus obviating the possibility that deterioration of data will occur.

What is claimed is:

1. A music data converting method comprising:
   (a) inputting a first digital audio data through an input terminal;
   (b) storing said first digital audio data into a first memory;
   (c) compressing said first digital audio data input from the first memory into a second digital audio data;
   (d) storing said second digital audio data into a second memory;
   (e) outputting said second digital audio data through a first output terminal;
   (f) converting said first digital audio data into an analog audio data;
   (g) outputting said analog audio data through a second output terminal.

2. A music apparatus comprising:
   an input terminal in which a first digital audio data is inputted;
   a first memory which stores said first digital audio data;
   a converter which inputs the first digital audio data from the first memory and compresses said first digital audio data into a second digital audio data;
   a second memory which stores said second digital audio data;
   a controller;
   a first output terminal which outputs said second digital audio data;
   a digital/analog converter for generating analog audio data; and
   a second output terminal which outputs the analog audio data;
   wherein said controller, based on the operation of the user, reads said second audio data from said second memory and outputs said second audio data through said first output terminal;
   wherein the digital/analog converter converts said first digital audio data into said analog audio data.

3. The music apparatus according to claim 2, wherein when a digital copy is selected, said controller reads said second digital audio data from said second memory and outputs said second audio data through said first output terminal; and
   wherein when an analog copy is selected, said controller reads said first digital audio data and outputs said analog data through said second output terminal.

4. A musical apparatus comprising:
   an input terminal in which first digital audio data is inputted from an external source;
   a first memory which stores said first digital audio data and is capable of outputting said first digital audio data;
   a converter which inputs the first digital audio data from the first memory and compresses said first digital audio data into second digital audio data,
   wherein said compression is accomplished without affecting a reproduction quality of said first digital audio data;
   a second memory which stores said second digital audio data;
   a controller;
   a first output terminal which outputs said second digital audio data,
   wherein said controller, based on an operation of a user, reads said second digital audio data from said second memory and outputs said second digital audio data through said first output terminal; and
   a second output terminal which, at least indirectly, outputs said first digital audio data, wherein said controller, based on an operation of a user, reads first digital audio data from said first memory and outputs said first digital audio data through said second output terminal.

\* \* \* \* \*